United States Patent
Lin et al.

(10) Patent No.: US 12,453,642 B2
(45) Date of Patent: Oct. 28, 2025

(54) EXPANDED SPINAL FUSION CAGE

(71) Applicant: National Yang Ming Chiao Tung University, Taipei (TW)

(72) Inventors: Chun-Li Lin, Taipei (TW); Shih-Chieh Shen, Taipei (TW); Shao-Fu Huang, Taipei (TW); Wei-Hsiang Sun, Taipei (TW)

(73) Assignee: National Yang Ming Chiao Tung University, Taipei (TW)

( * ) Notice: Subject to any disclaimer, the term of this patent is extended or adjusted under 35 U.S.C. 154(b) by 100 days.

(21) Appl. No.: 18/533,438

(22) Filed: Dec. 8, 2023

(65) Prior Publication Data

US 2024/0350282 A1    Oct. 24, 2024

(30) Foreign Application Priority Data

Apr. 21, 2023   (TW) ................................. 112203765

(51) Int. Cl.
*A61F 2/44* (2006.01)
*A61F 2/30* (2006.01)

(52) U.S. Cl.
CPC .......... *A61F 2/447* (2013.01); *A61F 2/30749* (2013.01); *A61F 2002/30112* (2013.01); *A61F 2002/30158* (2013.01); *A61F 2002/30383* (2013.01); *A61F 2002/30579* (2013.01); *A61F 2002/30784* (2013.01); *A61F 2002/30884* (2013.01); *A61F 2002/30902* (2013.01)

(58) Field of Classification Search
CPC ...... A61F 2/442; A61F 2/4425; A61F 2/4455; A61F 2002/443; A61F 2002/4435
USPC ........................................... 623/17.11–17.16
See application file for complete search history.

(56) References Cited

U.S. PATENT DOCUMENTS

| | | | | |
|---|---|---|---|---|
| 6,176,882 B1 * | 1/2001 | Biedermann | ........... | A61F 2/447 623/17.11 |
| 8,709,086 B2 * | 4/2014 | Glerum | ................. | A61F 2/4611 606/279 |
| 2007/0270968 A1 * | 11/2007 | Baynham | ................ | A61F 2/447 623/17.11 |
| 2014/0236296 A1 * | 8/2014 | Wagner | ................. | A61F 2/4611 623/17.15 |
| 2018/0042732 A1 * | 2/2018 | Seifert | .................. | A61F 2/4611 |
| 2019/0328540 A1 * | 10/2019 | Seifert | .................. | A61F 2/4611 |

FOREIGN PATENT DOCUMENTS

TW          I465228 B       12/2014

* cited by examiner

*Primary Examiner* — Julianna N Harvey
*Assistant Examiner* — Christina Negrellirodriguez
(74) *Attorney, Agent, or Firm* — RANKIN, HILL & CLARK LLP (57) ABSTRACT

An expanded spinal fusion cage is provided and includes: an outer frame; a sliding block set with a middle sliding block located within the outer frame, and the middle sliding block is located between two outer sliding blocks; a screw rod penetrating through and combined with the outer frame, and the screw rod is screwed with the middle sliding block, so that the middle sliding block is moved in translation in the outer frame and simultaneously expands the two outer sliding blocks by rotating the screw rod; two curved surface elements located outside the outer frame and combined with the two outer sliding blocks respectively, each of the curved surface elements has a wing plate; and two vertebral arch screws penetrating through and combined with the two wing plates.

9 Claims, 7 Drawing Sheets

EXPANDED SPINAL FUSION CAGE

BACKGROUND

1. Technical Field

The present disclosure relates to an orthopedic implant, and more particularly, to an expanded spinal fusion cage that is used to be implanted between two vertebral bodies.

2. Description of Related Art

Anterior cervical discectomy and fusion (ACDF) is a technique used to treat multi-level cervical spondylosis. Patients may have ossification of the posterior cervical ligament, severe herniation of multi-level intervertebral discs, and/or deformity correction; thus, a treatment including vertebral body resection is required to achieve the effect of nerve decompression or correction. In this operation, the cervical vertebrae that should be resected will be determined first, and then the implants will be used to fill in the resected vacant position to fix the cervical vertebrae. Whether the height of the implants can stabilize the cervical vertebra structure will significantly affect the recovery condition of the patient after the operation.

Depending on the height of the vertebral body and the range of resection, the implant should be designed as height-adjustable. For this reason, there is currently a known spinal implant using a rod and ring mechanism with threaded features, such mechanism drives the rod to perform telescopic movement in a single axial direction, so as to adjust the length dimension of the conventional spinal implant. After the conventional spinal implant is implanted into the vacant space to be backfilled, it can support the vertebral bodies of the upper and lower two adjacent segments, and bone plates and bone nails are locked on the two vertebral bodies simultaneously; and Taiwan published I465228 has disclosed a spinal implant similar to the aforementioned conventional spinal implant.

However, the conventional spinal implant elongates merely in one direction when expanding, so the adjustable elongation is quite limited: when desiring to increase the elongation, the overall height before expansion will become larger. Furthermore, since the diameter of the rod of the conventional spinal implant is greatly different from that of the main body after elongation, the problem of bone fusion cannot be effectively produced after filling the bone blocks or bone powder around the conventional spinal implants often happens after the operation due to the absorption of the bone repair material. Also, the support stability of the two vertebral bodies of the conventional spinal implant is easily reduced, resulting in a poor treatment effect.

In view of this, it is necessary to provide an expanded spinal fusion cage to solve the above-mentioned problems.

SUMMARY

The purpose of the present disclosure is to provide an expanded spinal fusion cage, which can be expanded synchronously in two directions, so as to increase the adjustable elongation and reduce the volume before expansion.

The purpose of the present disclosure is also to provide an expanded spinal fusion cage, of which the size difference between the expansion components is small, which can improve the support stability of the vertebral bodies and the effect of postoperative bone fusion.

The another purpose of the present disclosure is to provide an expanded spinal fusion cage, of which the resistance between the expansion components is small, which can improve the operation convenience during expanding.

In order to achieve the above purposes, the present disclosure provides an expanded spinal fusion cage, comprising: an outer frame: a sliding block set having a middle sliding block located within the outer frame, wherein the middle sliding block is located between two outer sliding blocks; a screw rod penetrating through and combined with the outer frame, wherein the screw rod is screwed with the middle sliding block, such that the middle sliding block is moved in translation in the outer frame and simultaneously expands the two outer sliding blocks by rotating the screw rod: two curved surface elements located outside the outer frame and combined with the two outer sliding blocks respectively, wherein each of the curved surface elements has a wing plate; and two vertebral arch screws penetrating through and combined with the two wing plates.

In some embodiments, the middle sliding block can have an upper opening with an upper slope surface facing the outer frame, and the middle sliding block can have a lower opening with a lower slope surface facing the outer frame, wherein the two outer sliding blocks can abut against the upper slope surface and the lower slope surface respectively by a slope surface.

In some embodiments, the upper slope surface and the lower slope surface may be each inclined at 45 degrees.

In some embodiments, the middle sliding block may have two upper sliding grooves and two lower sliding grooves, each of the outer sliding blocks may have two convex parts, and an oblique groove may be formed between the two convex parts and the slope surface, wherein the two convex parts of one of the outer sliding blocks are slidably disposed in the two upper sliding grooves of the middle sliding block, and the two convex parts of the other one of the outer sliding blocks are slidably disposed in the two lower sliding grooves of the middle sliding block.

In some embodiments, several locking holes can be provided at an outer end surface of each of the outer sliding blocks, each of the locking holes can penetrate to the oblique groove, each of the two curved surface elements has a substrate, and the substrate can have several counterbores, and several countersunk screws can penetrate through the several counterbores and be screwed into the several locking holes.

In some embodiments, the outer frame has a peripheral wall, and the peripheral wall may be provided with several through holes.

In some embodiments, each of the two curved surface elements can be combined with the corresponding outer sliding block by a substrate, the substrate of the curved surface element can be provided with at least one through aperture, and the through aperture of the curved surface element can be aligned to and in communication with at least one through opening of the corresponding outer sliding block.

In some embodiments, each of the two curved surface elements may have a substrate, and the substrate may be combined with an outer end surface of the outer sliding block by a combining surface, and the substrate may have a customized curved surface opposing the combining surface.

In some embodiments, each of the two curved surface elements may have a wing plate connected to a rear edge of the substrate, and the wing plate may have a customized vertebral body combining angle relative to the outer frame.

In some embodiment, the outer frame may be in a rectangular tube shape, the middle sliding block may be a trapezoidal block with a short side facing backward and a long side facing forward, and the screw rod may penetrate through a front surface and a rear surface of the middle sliding block, wherein when the sliding block set is in an initial position, the middle sliding block can be located closest to a front side of the outer frame, and the two outer sliding blocks can be closest to each other and located within the outer frame.

The expanded spinal fusion cage according to the present disclosure has the following characteristics: the two outer sliding blocks can be pushed against simultaneously by the middle sliding block with the design of the sliding block set, so that the overall required elongation can be divided equally between the two outer sliding blocks to achieve the effect of bidirectional synchronous expansion, thereby increasing the adjustable elongation to apply to more vertebral body heights and resection ranges, and improving practicability while reducing the volume before expanding, which is convenient for packaging and transportation. Furthermore, the upper and lower of the middle sliding block are designed with outer sliding blocks, which can also reduce the resistance between the sliding blocks, save effort in moving, and reduce the size difference between the expansion components. Therefore, the present disclosure has multiple technical effects such as improving the convenience of packaging and carrying, practicality, operation convenience during surgery, support stability of the vertebral body, and the bone fusion and treatment effect after surgery.

DETAILED DESCRIPTION

The embodiment of the present disclosure is described in detail as following in conjunction with the drawings. The attached drawings are simplified schematic diagrams, which illustrate the basic structure of the present disclosure in a schematic way. Therefore, only elements related to the present disclosure are marked in these drawings, and the number, shape, size ratio, etc. of the displayed elements are not drawn as that of being implemented. The specifications and sizes of actual implementation are actually a selective design, and the arrangement of the elements may be more complicated.

The following descriptions of various embodiments refer to the accompanying drawings to illustrate specific embodiments in which the present disclosure may be practiced. The directional terms mentioned in the present disclosure, such as "upper," "lower," "front," "back," etc., are in principle consistent with the anatomical location after implanting in the human body; that is, according to the coordinate system shown in FIG. 1, the X direction is "left and right," the Y direction is "front and back," and the Z direction is "upper and lower." In addition, the word "comprising" in the specification will be understood as meaning including the stated elements, but not excluding any other elements, unless it is clearly described to the contrary.

Figure 1:
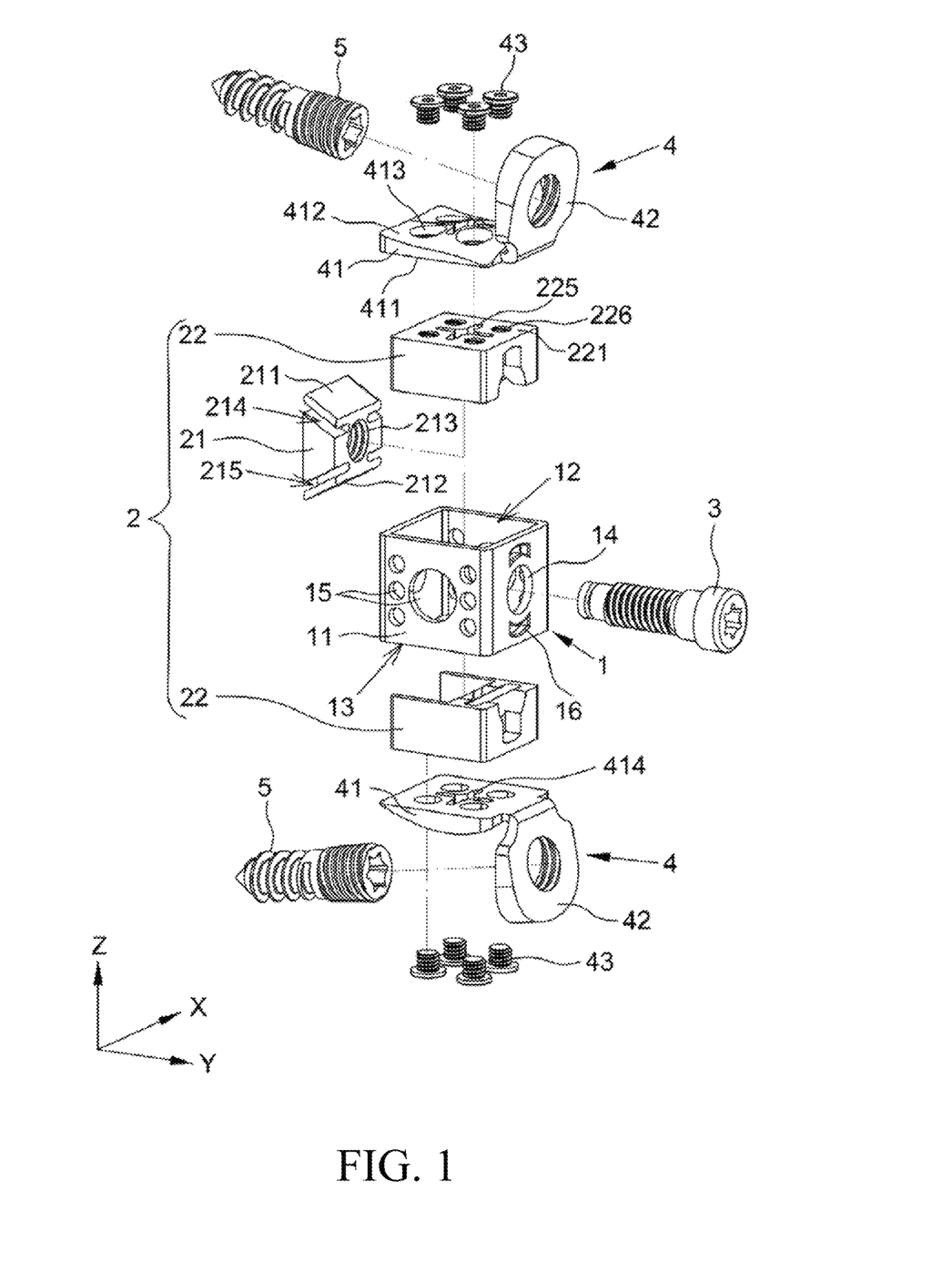
FIG. 1 is an exploded perspective view according to an embodiment of the present disclosure.
Figure 2:
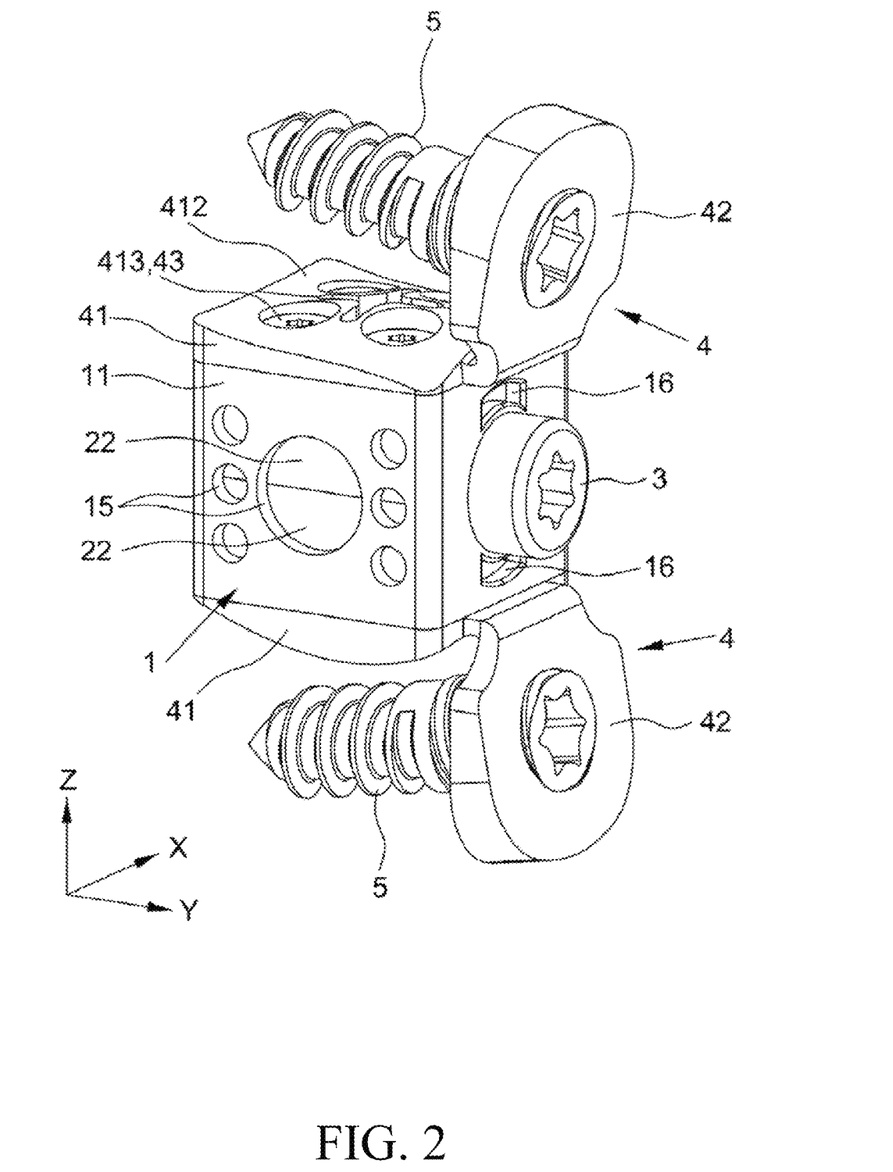
FIG. 2 is an assembled perspective view according to an embodiment of the present disclosure, wherein vertebral arch screws are omitted.

Referring to FIG. 1 and FIG. 2, it is a preferred embodiment of an expanded spinal fusion cage of the present disclosure, and the expanded spinal fusion cage comprises an outer frame 1, a sliding block set 2, a screw rod 3, two curved surface elements 4 and two vertebral arch screws 5. The sliding block set 2 and the screw rod 3 are disposed on the outer frame 1, and the two curved surface elements 4 are combined with the sliding block set 2 and provided for combining with the two vertebral arch screws 5.

The outer frame 1 is substantially in a tubular shape and has a peripheral wall 11, an upper opening 12 and a lower opening 13 opposing the upper opening 12. A front side and a rear side of the peripheral wall 11 respectively have a combining hole 14 for combining the screw rod 3. The peripheral wall 11 can also be provided with several through holes 15 and several instrument holes 16. The sizes and shapes of the several through holes 15 can be the same or different, and the through holes 15 are mainly used for filling bone repair materials such as bone repair blocks or bone powder. The several instrument holes 16 can be selected to be disposed on the rear side of the outer frame 1, for example, one of the instrument holes 16 is disposed on the upper of the combining hole 14 on the rear side of the outer frame 1, and the other one of the instrument holes 16 is disposed on the lower of the combining hole 14 on the rear side of the outer frame 1, such that the instruments holes 16 can be held by the surgical instruments to place the whole expanded spinal fusion cage in the body of patient. Also, the outer frame 1 in this embodiment may be substantially in a rectangular tube shape, but the present disclosure is not limited to as such. A height (Z direction) of the outer frame 1 may be about 10 mm to 30 mm, for example two specifications of 12 mm or 25 mm high, which are applicable to the surgical situation of resecting one or two segments of vertebral body.

Figure 3:
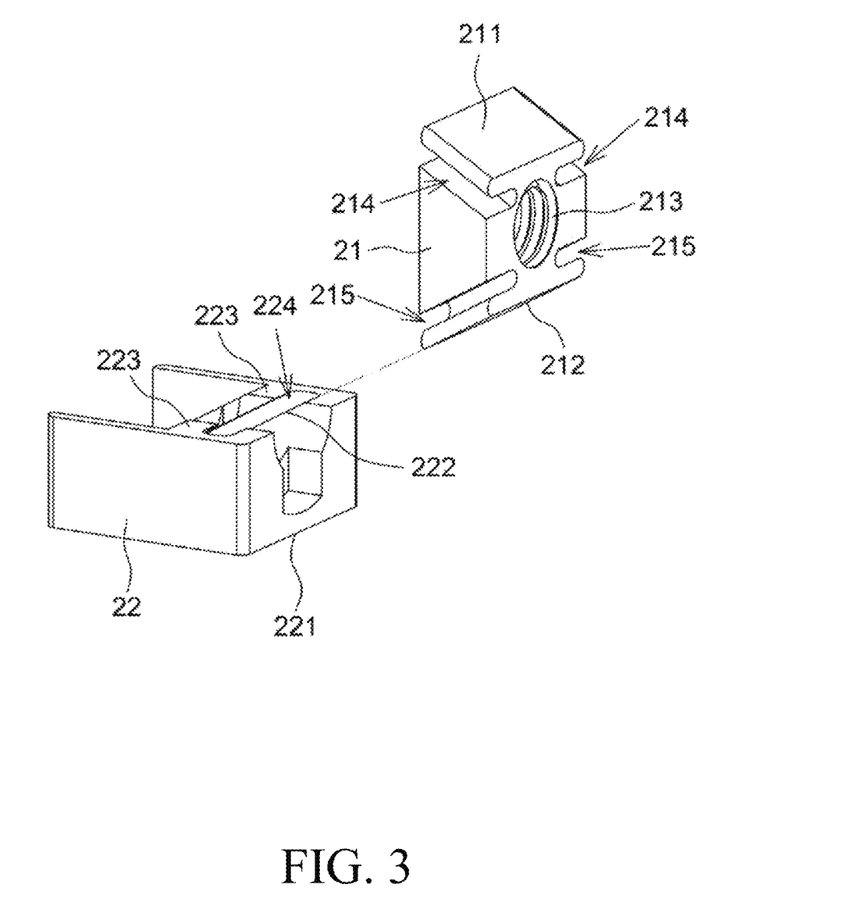
FIG. 3 is an exploded perspective view of a middle sliding block and a lower outer sliding block according to an embodiment of the present disclosure.
Figure 5:
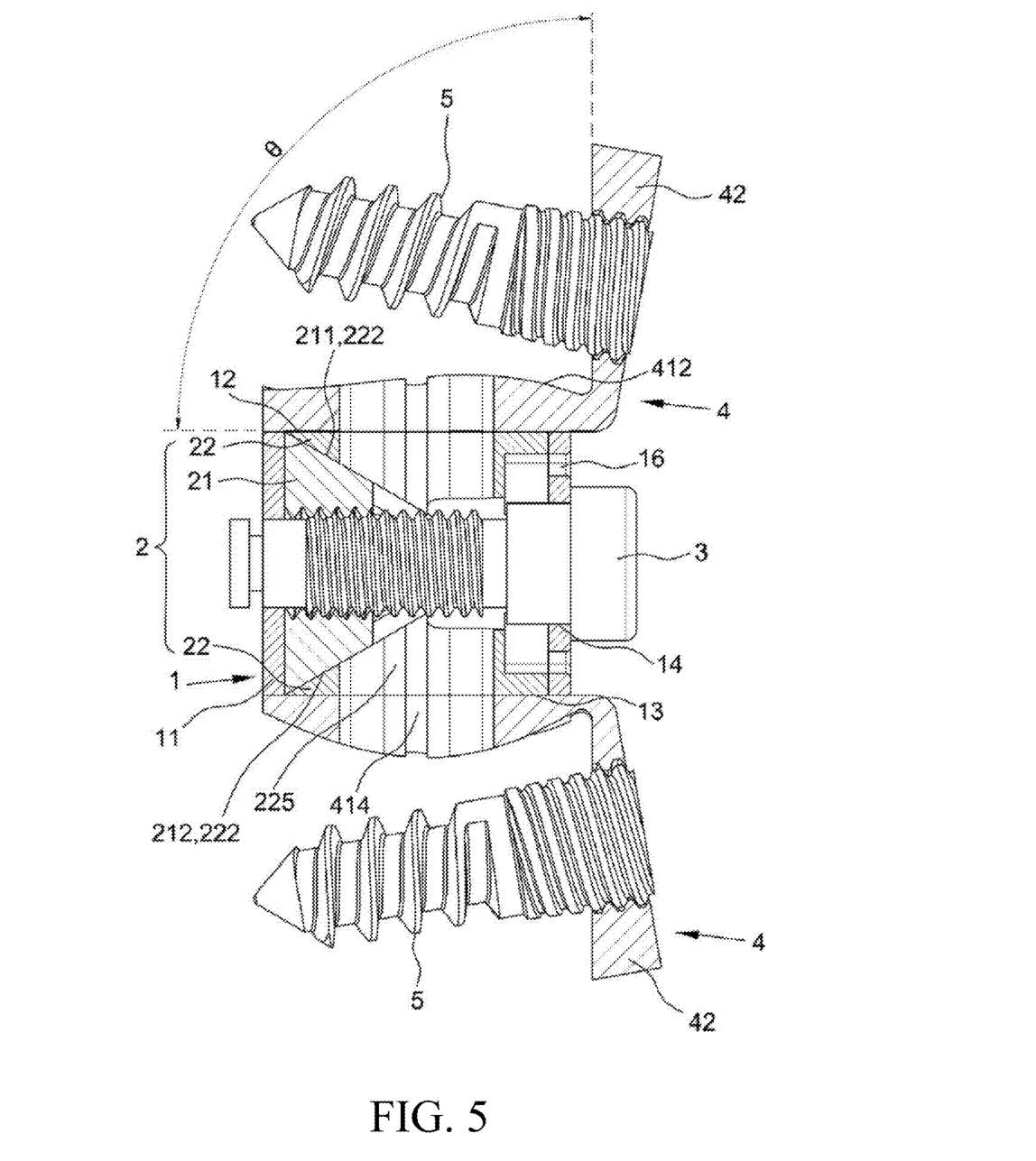
FIG. 5 is an assembled side sectional view according to an embodiment of the present disclosure before expanding.

Referring to FIG. 3 and FIG. 5, the sliding block set 2 has a middle sliding block 21 located within the outer frame 1, and the middle sliding block 21 is substantially a trapezoidal block with a short side facing backward and a long side facing forward. An upper slope surface 211 of the middle sliding block 21 faces the upper opening 12, and a lower slope surface 212 of the middle sliding block 21 faces the lower opening 13, and the upper slope surface 211 and the lower slope surface 212 can be each inclined at 45 degrees. A screw hole 213 penetrates through the front and rear surfaces of the middle sliding block 21, and the screw hole 213 is substantially located between the upper slope surface 211 and the lower slope surface 212. Further, the middle sliding block 21 of this embodiment can also have two upper sliding grooves 214 parallel to the upper slope surface 211 and two lower sliding grooves 215 parallel to the lower slope surface 212. The two upper sliding grooves 214 and the two lower sliding grooves 215 all penetrate through the front and rear surfaces of the middle sliding block 21. The two upper sliding grooves 214 can be on left and right opposing each other, and the two lower sliding grooves 215 can also be on left and right opposing each other. The two upper sliding grooves 214 and the two lower sliding grooves 215 are respectively open in the left and right surfaces of the middle sliding block 21.

Figure 4:
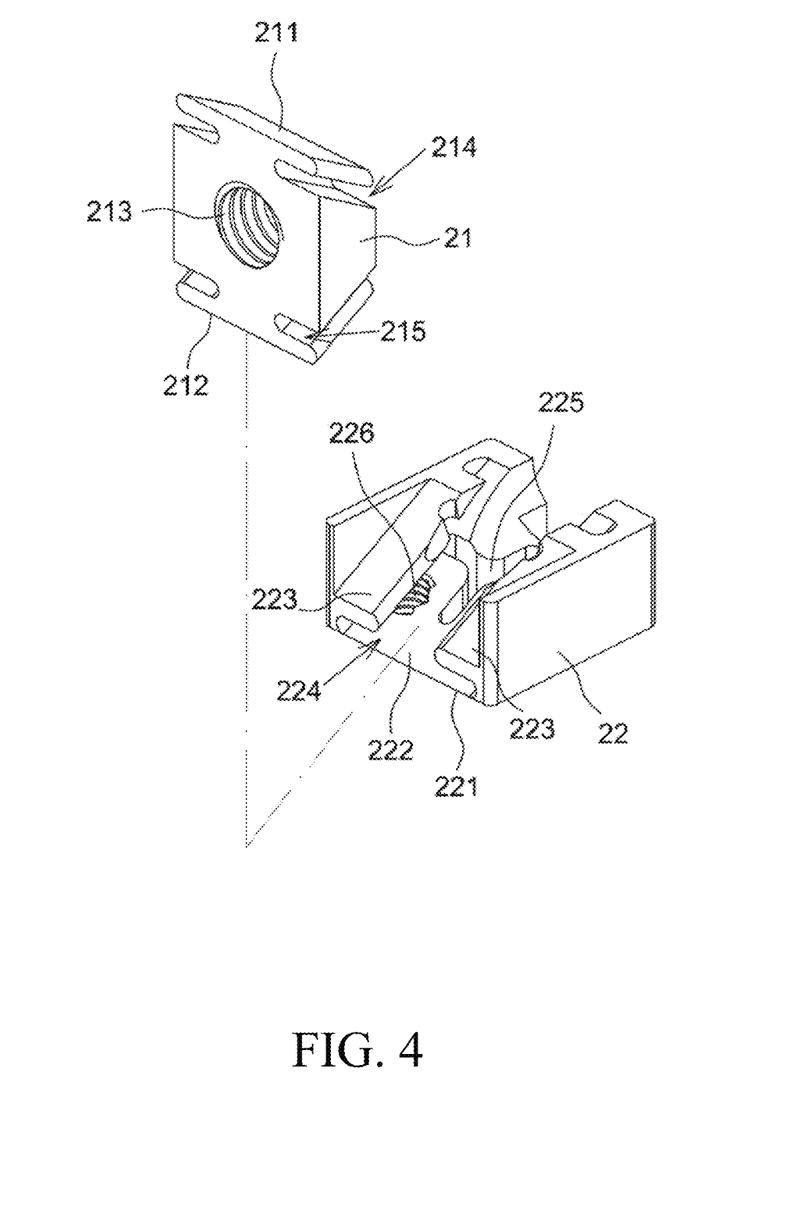
FIG. 4 is another exploded perspective view of the middle sliding block and the lower outer sliding block according to an embodiment of the present disclosure.

Referring to FIG. 4 and FIG. 5, the sliding block set 2 further has two outer sliding blocks 22, and the middle sliding block 21 is substantially located between the two outer sliding blocks 22. Each of the two outer sliding blocks 22 has an outer end surface 221 and a slope surface 222. The two outer sliding blocks 22 respectively face the inside of the outer frame 1 from the slope surfaces 222, and the two outer sliding blocks 22 are abutted against the upper slope surface 211 and the lower slope surface 212 of the middle sliding block 21 respectively by the slope surfaces 222, so that when the middle sliding block 21 moves forward and backward with respect to the two outer sliding blocks 22, the two outer sliding blocks 22 can be displaced upward and downward to move away from or approach each other. In this embodiment, two convex parts 223 on left and right opposing each other may be formed in each of the outer sliding blocks 22, so as to form an oblique groove 224 between the two convex parts 223 and the slope surface 222. In this way, the two convex parts 223 of the upper outer sliding block 22 are slidably disposed in the two upper sliding grooves 214 of the middle sliding block 21, and the two convex parts 223 of the lower outer sliding block 22 are slidably disposed in the two lower sliding grooves 215 of the middle sliding block 21, so that the two outer sliding blocks 22 are engaged with the middle sliding block 21 to slide relative to each other but without separating upward and downward.

In addition, referring to FIG. 1 and FIG. 4, each of the two outer sliding blocks 22 is also provided with at least one through opening 225 for filling bone repair material; in this embodiment, the through openings 225 of the two outer sliding blocks 22 can be selectively penetrated inward from the outer end surfaces 221, but the present disclosure is not limited to as such. In addition, several locking holes 226 can be provided at the outer end surface 221 of each of the outer sliding blocks 22, and each of the locking holes 226 can penetrate to the oblique groove 224.

Referring to FIG. 1 and FIG. 5, the screw rod 3 penetrates through and is combined with the two combining holes 14 of the outer frame 1, and the screw rod 3 penetrates through the two outer sliding blocks 22 and is screwed in the screw hole 213 of the middle sliding block 21.

Figure 7:
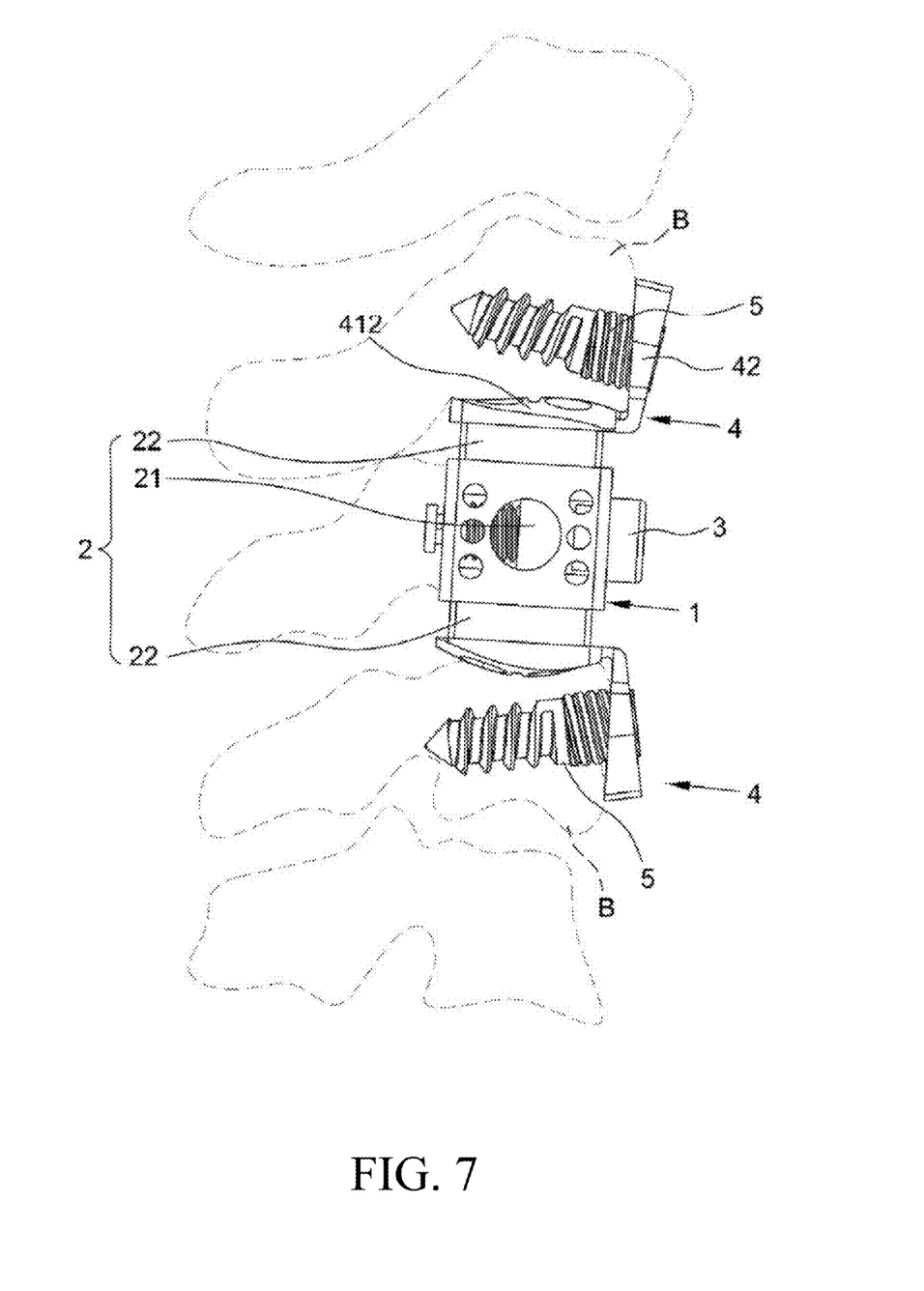
FIG. 7 is a schematic diagram according to an embodiment of the present disclosure combined with a vertebral body.

Each of the curved surface elements 4 has a substrate 41. The substrate 41 may have a combining surface 411 and a customized curved surface 412 opposing the combining surface 411, and several counterbores 413 which may penetrate through the combining surface 411 and the customized curved surface 412. Each of the two curved surface elements 4 is located outside the outer frame 1, and can be combined with the outer end surface 221 of the outer sliding block 22 by the combining surface 411 of the substrate 41, and can be screwed into the several locking holes 226 of the outer sliding block 22 by penetrating several countersunk screws 43 through the several counterbores 413, wherein the several countersunk screws 43 can also be replaced by pins to fix the two curved surface elements 4 to the two outer sliding blocks 22. Referring to FIG. 7, the customized curved surface 412 of the substrate 41 of each of the two curved surface elements 4 conforms to a curved shape of end-plate of a vertebral body B which the upper and lower two adjacent segments of the patient's vertebral vacant space to be backfilled by the expanded spinal fusion cage. For example, reverse engineering/process can be used to first reconstruct the three-dimensional (3D) model of the patient's vertebral, and then use the point cloud data to measure a curved surface of the upper end-plate of vertebral body of the model. In order to simplify the design, the curves of the characteristic cross section of the front, middle and back sections are intercepted, and then eleven points averaged on the curve are defined to reconstruct the surface, and finally the thickness of the curved surface is increased, and the curved surface is designed into a curved-surface block to form the substrate 41. In addition, the substrate 41 of each of the curved surface elements 4 is also provided with at least one through aperture 414 for filling bone repair material, wherein the through aperture 414 of each of the curved surface elements 4 is preferably aligned to and in communication with the through opening 225 of the corresponding outer sliding block 22, so that the bone repair material can be more easily filled into the expanded spinal fusion cage from the outside.

On the other hand, each of the curved surface elements 4 can have a wing plate 42, and the wing plate 42 can be connected to the rear edge of the substrate 41. The wing plates 42 of the two curved surface elements 4 extend upwards and downwards respectively, so as to respectively be aligned to the vertebral body B which the upper and lower two adjacent segments of the patient's vertebral vacant space to be backfilled by the expanded spinal fusion cage, and the two vertebral arch screws 5 penetrate through and are combined with the two wing plates 42 and the two vertebral bodies B respectively. Preferably, an inner side surface of one of the two wing plates 42 has a customized vertebral body combining angle θ with respect to the top surface of the outer frame 1, and an inner side surface of the other one of the two wing plates 42 has another customized vertebral body combining angle θ with respect to the bottom surface of the outer frame 1, so that the inner side surface of each of the wing plates 42 can be more aligned with the corresponding vertebral body B to improve the stability of the combination of the overall expanded spinal fusion cage and the two vertebral bodies B with a customized combining angle.

Figure 6:
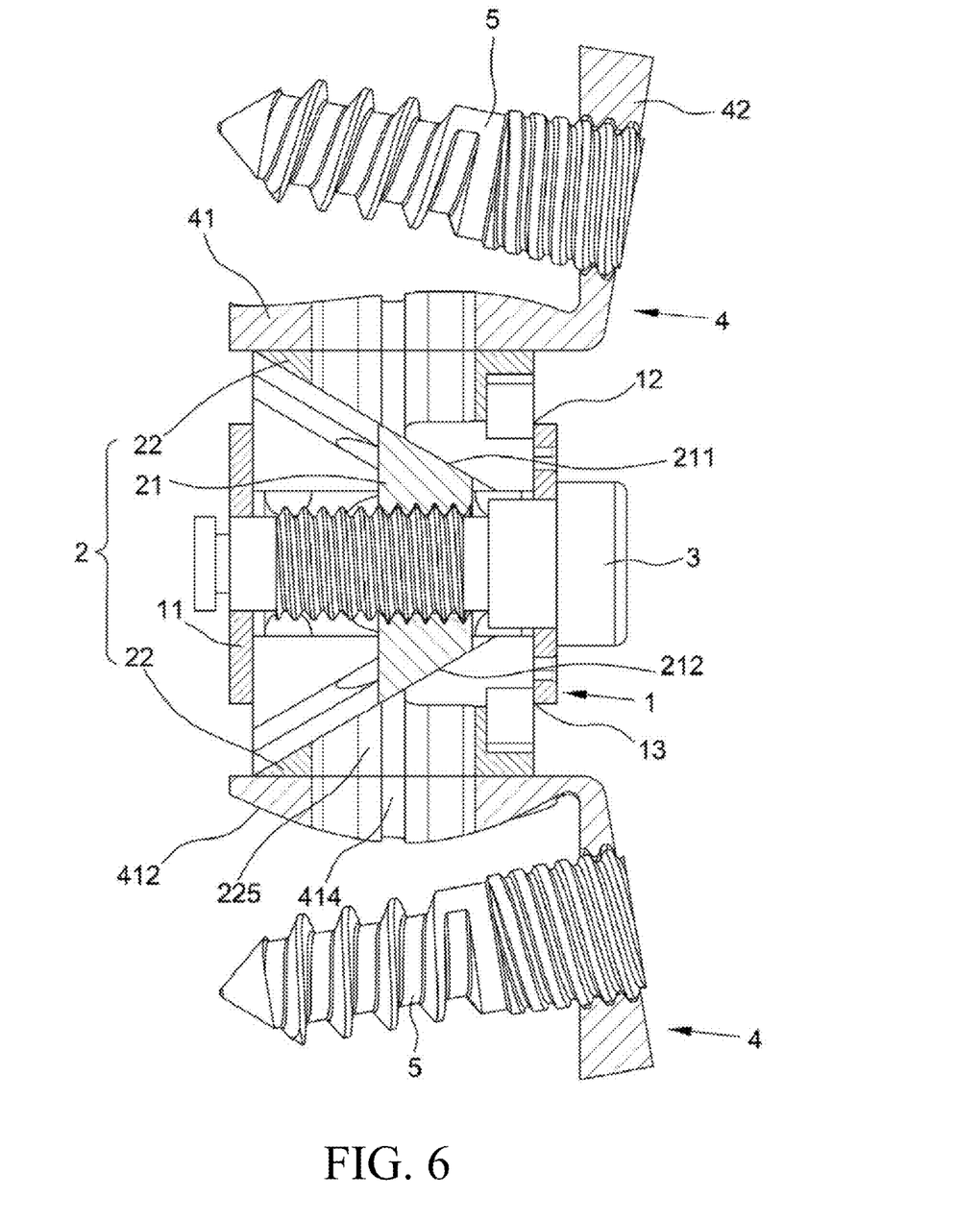
FIG. 6 is an assembled side sectional view according to an embodiment of the present disclosure after expanding.

According to the aforementioned structure and referring to FIG. 5, in the expanded spinal fusion cage of the present disclosure, when the sliding block set 2 is in the initial position, the middle sliding block 21 can be located closest to the front side, and the two outer sliding blocks 22 can be closest to each other and almost located within the outer frame 1. Referring to FIG. 6 and FIG. 7, after the expanded spinal fusion cage is placed in the patient's vertebral vacant space, the screw rod 3 can be rotated and limited by the outer frame 1 to rotate in situ. The middle sliding block 21 driven by the screw rod 3 is restricted by the outer frame 1 and the two outer sliding blocks 22 and thus cannot rotate, such that the movement of the middle sliding block 21 is translated along the axis of the screw rod 3 and toward the rear end of the screw rod 3. In this way, the middle sliding block 21 can translate relative to the two outer sliding blocks 22 in the outer frame 1, and the upper slope surface 211 and the lower slope surface 212 of the middle sliding block 21 are used to respectively push against the two outer sliding blocks 22 to achieve the effect of synchronously expanding the two outer sliding blocks 22 outwards and making the parts of the two outer sliding blocks 22 respectively protrude from the upper opening 12 and the lower opening 13 of the outer frame I until the customized curved surfaces 412 of the two curved surface elements 4 being abutted against the two vertebral bodies B respectively. The two wing plates 42 are aligned to the two vertebral bodies B respectively, and then the two vertebral arch screws 5 penetrate through and are combined with the two wing plates 42 and the two vertebral bodies B respectively to stabilize the expanded spinal fusion cage and avoid relative displacement from the two vertebral bodies B. Finally, bone repair material can be filled in the several through holes 15 of the outer frame 1, the through aperture 414 of each of the curved surface elements 4, or the through opening 225 of each of the outer sliding blocks 22 to improve the bone fusion of the expanded spinal fusion cage and the vertebra.

In view of the above, in the expanded spinal fusion cage according to the present disclosure, the two outer sliding blocks can be pushed against simultaneously by the middle sliding block with the design of the sliding block set, so that the overall required elongation can be divided equally between the two outer sliding blocks to achieve the effect of bidirectional synchronous expansion, thereby increasing the adjustable elongation to apply to more vertebral body heights and resection ranges, and improving practicability while reducing the volume before expanding, which is convenient for packaging and transportation. Furthermore, the upper and lower of the middle sliding block are designed with outer sliding blocks, which can also reduce the resistance between the sliding blocks, save effort in moving, and reduce the size difference between the expansion components. Therefore, the present disclosure has multiple technical effects such as improving the convenience of packaging and carrying, practicality, operation convenience during surgery, support stability of the vertebral body, and the bone fusion and treatment effect after surgery.

The above embodiments are provided for illustrating the principles of the present disclosure and its technical effect, and should not be construed as to limit the present disclosure in any way. The above embodiments can be modified by one of ordinary skill in the art without departing from the spirit and scope of the present disclosure. Therefore the scope claimed of the present disclosure should be defined by the following claims.

What is claimed is:

1. An expanded spinal fusion cage, comprising:
   an outer frame;
   a sliding block set having a middle sliding block located within the outer frame, wherein the middle sliding block is located between two outer sliding blocks;
   a screw rod penetrating through and combined with the outer frame, wherein the screw rod is screwed with the middle sliding block, such that the middle sliding block is moved in translation in the outer frame and simultaneously expands the two outer sliding blocks by rotating the screw rod;
   two curved surface elements located outside the outer frame and combined with the two outer sliding blocks respectively, wherein each of the two curved surface elements has a wing plate; and
   two vertebral arch screws penetrating through and combined with the two wing plates, wherein the middle sliding block has an upper slope surface facing an upper opening of the outer frame, and the middle sliding block has a lower slope surface facing a lower opening of the outer frame, wherein the two outer sliding blocks are abutted against the upper slope surface and the lower slope surface respectively by a slope surface.

2. The expanded spinal fusion cage of claim 1, wherein the upper slope surface and the lower slope surface are each inclined at 45 degrees.

3. The expanded spinal fusion cage of claim 1, wherein the middle sliding block has two upper sliding grooves and two lower sliding grooves, each of the two outer sliding blocks has two convex parts, and an oblique groove is formed between the two convex parts and the slope surface, wherein the two convex parts of one of the two outer sliding blocks are slidably disposed in the two upper sliding grooves of the middle sliding block, and the two convex parts of the other one of the two outer sliding blocks are slidably disposed in the two lower sliding grooves of the middle sliding block.

4. The expanded spinal fusion cage of claim 3, wherein an outer end surface of each of the two outer sliding blocks is provided with several locking holes, each of the locking holes penetrates to the oblique groove, each of the two curved surface elements has a substrate having several counterbores, and several countersunk screws penetrate through the several counterbores and are screwed into the several locking holes.

5. The expanded spinal fusion cage of claim 1, wherein the outer frame has a peripheral wall provided with several through holes.

6. The expanded spinal fusion cage of claim 1, wherein each of the two curved surface elements is combined with the corresponding outer sliding block by a substrate, the substrate of the curved surface element is provided with at least one through aperture, and the at least one through aperture of the curved surface element is aligned to and in communication with at least one through opening of the corresponding outer sliding block.

7. The expanded spinal fusion cage of claim 1, wherein each of the two curved surface elements has a substrate, and the substrate is combined with an outer end surface of the corresponding outer sliding block by a combining surface, and the substrate has a customized curved surface opposing the combining surface.

8. The expanded spinal fusion cage of claim 7, wherein the wing plate of each of the two curved surface elements is connected to a rear edge of the substrate, and has a customized vertebral body combining angle relative to the outer frame.

9. The expanded spinal fusion cage of claim 1, wherein the outer frame has a rectangular tube shape, the middle sliding block is a trapezoidal block with a short side facing backward and a long side facing forward, and the screw rod penetrates through a front surface and a rear surface of the middle sliding block, wherein when the sliding block set is in an initial position, the middle sliding block is located closest to a front side of the outer frame, and the two outer sliding blocks are closest to each other and located within the outer frame.

* * * * *